United States Patent
Lu et al.

(10) Patent No.: US 8,095,561 B2
(45) Date of Patent: Jan. 10, 2012

(54) EXTENSIBLE FRAMEWORK FOR DATA IMPORT AND EXPORT

(75) Inventors: Bin Lu, Redmond, WA (US); Mehul Y. Shah, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 349 days.

(21) Appl. No.: 12/428,491

(22) Filed: Apr. 23, 2009

(65) Prior Publication Data

US 2010/0274813 A1   Oct. 28, 2010

(51) Int. Cl.
*G06F 17/30* (2006.01)

(52) U.S. Cl. .......... 707/792; 707/602

(58) Field of Classification Search .......... None
See application file for complete search history.

(56) References Cited

U.S. PATENT DOCUMENTS

| | | | |
|---|---|---|---|
| 6,618,727 B1 * | 9/2003 | Wheeler et al. | 707/748 |
| 7,072,934 B2 | 7/2006 | Helgeson et al. | |
| 7,152,074 B2 | 12/2006 | Dettinger et al. | |
| 7,165,041 B1 | 1/2007 | Guheen et al. | |
| 7,366,729 B2 | 4/2008 | Vincent, III | |
| 2006/0225032 A1 | 10/2006 | Klerk et al. | |
| 2007/0168336 A1 * | 7/2007 | Ransil et al. | 707/3 |
| 2008/0085502 A1 | 4/2008 | Allen et al. | |
| 2009/0327321 A1 * | 12/2009 | McCormack et al. | 707/101 |

OTHER PUBLICATIONS

"Description of References and Data Models for Classification", Retrieved at<<http://www.ticpme2010.fr/referentiel/catalogues_electroniques/documents/1Travaux%20CEN/cwa15295-00-2005-Aug_DataModelsForClassification.pdf>>, Aug. 2005, p. 130.

Brandt, et al. "Metadata-Driven Creation of Data Marts from an EAV-Modeled Clinical Research Database", Retrieved at<<http://ycmi.med.yale.edu/trialdb/publications/225.pdf>>, Sep. 3, 2002, pp. 225-241.

"Microsoft Dynamics CRM Data Import", Retrieved at<<http://blogs.msdn.com/crm/archive/2007/12/17/microsoft-dynamics-crm-data-import.aspx>>.

"Microsoft Retail Management System and Microsoft Dynamics GP", Retrieved at<<http://download.microsoft.com/download/8/3/f/83f29e7d-1c0e-4414-b8ac-8e93e30dd594/MicrosoftDynamicsGPRetail.pdf>>, 2006.

* cited by examiner

*Primary Examiner* — Shahid Alam
*Assistant Examiner* — Jagdish Pandya
(74) *Attorney, Agent, or Firm* — Turk IP Law, LLC

(57) ABSTRACT

A modular framework for data import/export in an application that allows modules/components to be independently developed for importing and exporting data related to specific entities, including the handling of dependencies between entities. The framework is metadata driven which allows new entities to be introduced in the application with new modules for importing/exporting data related to those entities, without updating modules for exporting existing entities. Each type of entity is defined with a schema that represents the logical entity such that the entity is agnostic as to how the entity data is stored in database tables. A master configuration file is created for the application that lists each entity that can be imported or exported by the application, and defines how the framework imports or exports the business entity. Additionally, dynamic batching is provided to divide large datasets into multiple batches for suitable consumption by consumers of the exported data.

11 Claims, 9 Drawing Sheets

EXTENSIBLE FRAMEWORK FOR DATA IMPORT AND EXPORT

BACKGROUND

A business application deals with many types of business entities such as "Item", "Customer", etc. The physical records for each type of the logical business entity are stored in multiple tables in the database (e.g., SQL server). For example, the data for "Entity1" can be stored in tables such as [Entity1_Table1], [Entity1_Table2], [Entity1_Table3], etc. Moreover, these logical business entities can have relationships with each other that are tracked through foreign key referential integrity constraints in the database, for example, a transaction record refers to a customer record.

The data stored in the physical database is typically normalized. There are times when external data needs to be imported into the database or when changes to data in the database in a specific period need to be exported. The format or schema in which the data is exported or imported is typically in the logical form and not in the same normalized format in which the data exists in the database. For example, the logical entity "Item" needs to be represented through a schema as a single entity even if data for each item is stored in multiple physical database tables.

Moreover, in a business application, new entities can be introduced with new relationships. Sometimes, these new entities are created as part of customizing the business application for each customer. These new entities will also need to be represented with a logical schema in which the data for these entities will be imported from or exported to the application—this logical schema may again be different from the physical schema in which the data is stored in database tables. Existing techniques lack a generic framework for importing and exporting data that considers new entities being introduced into the business application.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture is a modular framework for data import/export in an application that allows modules/components to be independently developed for importing and exporting data related to specific entities, including the handling of dependencies between entities. Additionally, the import/export framework is metadata driven which allows new entities to be introduced in the application with new modules for importing/exporting data related to those entities, without updating modules for importing/exporting existing entities.

In a business implementation, the data import and export framework allows a point-of-sale application to exchange data with other business applications. Each type of business entity is defined with a schema (e.g., XML (extensible markup language) schema where the entity schema can be Entity.schema) that represents the logical entity such that the entity is agnostic as to how the entity data is stored in the database (e.g., SQL) tables. A master configuration file is created for the application that lists each logical entity that can be imported or exported by the application. The master configuration file defines how the framework imports or exports the business entity.

Additionally, dynamic batching is provided to divide large datasets into multiple XML documents for shipping and suitable consumption by data consumers.

In one implementation, the data can be imported or exported using an XML format; however, alternatively, other formats can be employed without departing from the scope of the disclosed architecture.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
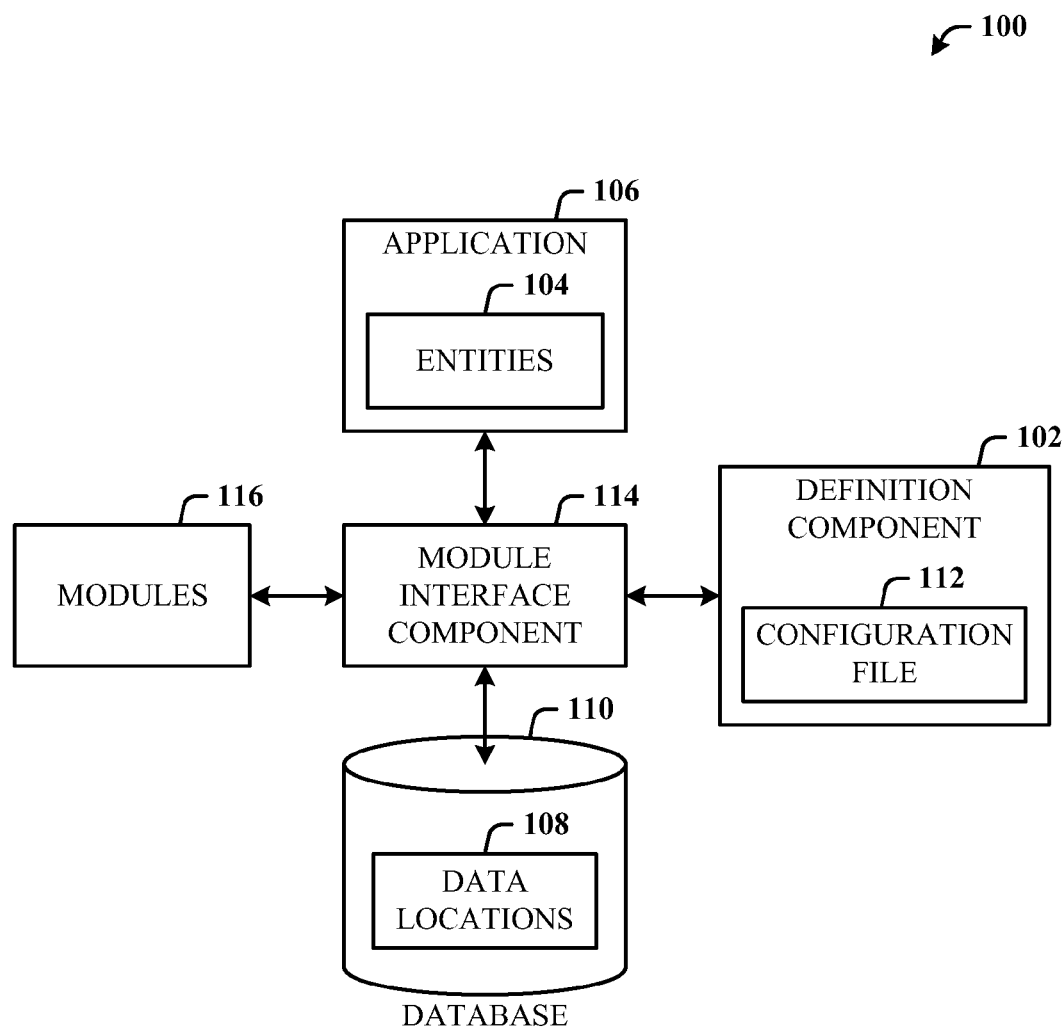
FIG. 1 illustrates a computer-implemented data system in accordance with the disclosed architecture.

The disclosed architecture is a generic framework for importing and exporting data in a business environment that takes into account new entities that can be introduced in an application such as a business application. Modules and components can be independently developed for importing and exporting data related to specific entities and dependencies between entities. The architecture is a metadata driven import/export framework that allows new entities to be introduced in the application with new modules for importing/exporting data related to those entities—without updating modules for importing/exporting existing entities. The description herein applies to any business application that deals with business data.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented data system 100 in accordance with the disclosed architecture. The system 100 includes a definition component 102 for defining exchange of data between entities 104 of an application 106 and data locations 108 of a database 110, the exchange defined in a configuration file 112. The system 100 also includes a modular interface component 114 for processing one or more modules 116 that facilitate the exchange of the data between the entities 104 and the data locations 108 based on the configuration file 112.

The definition component 102 and the modular interface component 114 can be part of a business framework that handles business data between the database 110 (e.g., a business database) and the application 106 (e.g., a business application). The entities 104 are processed according to an ordered sequence defined in the configuration file 112. The configuration file 112 includes entity dependencies that are processed according to an ordered sequence. Each of the entities 104 is associated with a corresponding entity schema that defines entity dependencies and an import/export operation. Each of the one or more modules 116 includes at least one of import logic or export logic for data of a specific entity of the entities 104. The configuration file 112 is extensible for defining new entities and new schemas for data import/export between the application and the database.

Figure 2:
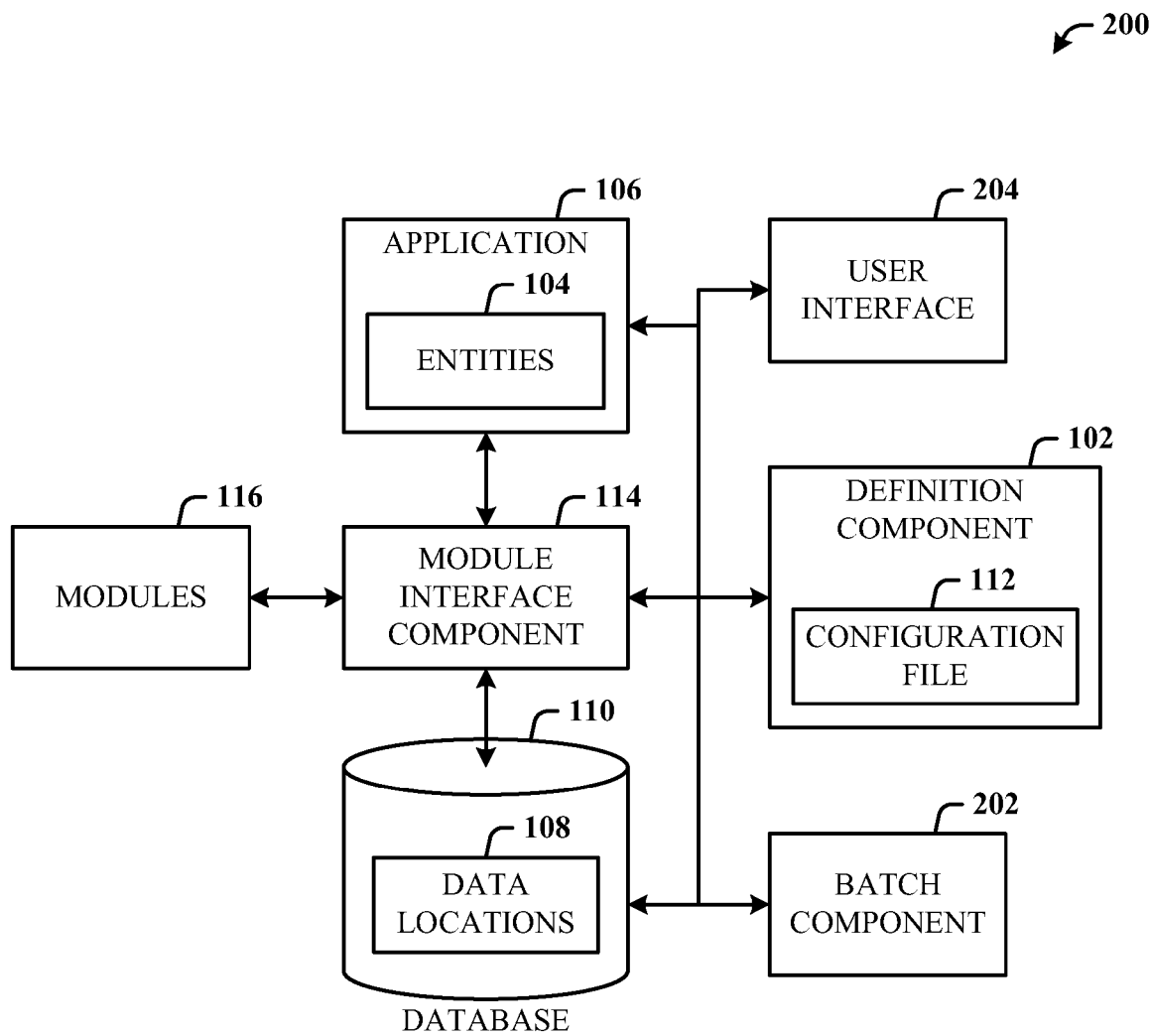
FIG. 2 illustrates an alternative embodiment of a system for data processing using a metadata driven import/export framework.

FIG. 2 illustrates an alternative embodiment of a system 200 for data processing using a metadata driven import/export framework. The system 200 includes the elements and components of system 100 of FIG. 1. For example, the system 200 includes the definition component 102 for defining exchange of data between entities 104 of the application 106 and the data locations 108 of the database 110, as defined in the configuration file 112, and the modular interface component 114 for processing one or more modules 116 that facilitate the exchange of the data between the entities 104 and the data locations 108 based on the configuration file 112.

The system 200 can further comprise a batch component 202 for dividing the data being exported from the database into multiple batches suitable for consumption by consumers of the exported data. The system 200 can also further comprise a user interface 204 for interacting with the definition component 102 to edit the configuration file 112 and entities 104, and also interacting with the modular interface component 114 to insert a new module or remove an existing module for import and export of the data.

Put another way, in the context of business data, the system 200 includes an extensible definition component for defining the exchange of business data between the entities 104 of a business application (e.g., the application 106) and the data locations 108 of a business database (e.g., the database 110). The exchange is defined in the configuration file 112 by entity definitions and entity schemas. The system 200 further includes the modular interface component 114 for processing one or more of the modules 116 that facilitate the exchange of the business data between the entities 104 and data locations 108 based on the configuration file 112. The one or more of the modules 116 include at least one of import or export logic for a specific data entity. The entities 104 are processed according to an ordered sequence and entity dependencies both defined in the configuration file 112.

The system 200 further comprises the batch component 202 for dividing the data being exported from the database into multiple batches suitable for consumption by consumers of the exported data. The extensible definition component 102 receives new entity information for definition in the configuration file 112, and the modular interface component 114 receives one or more new modules for processing import or export of data of new entities according to the new entity information.

Figure 3:
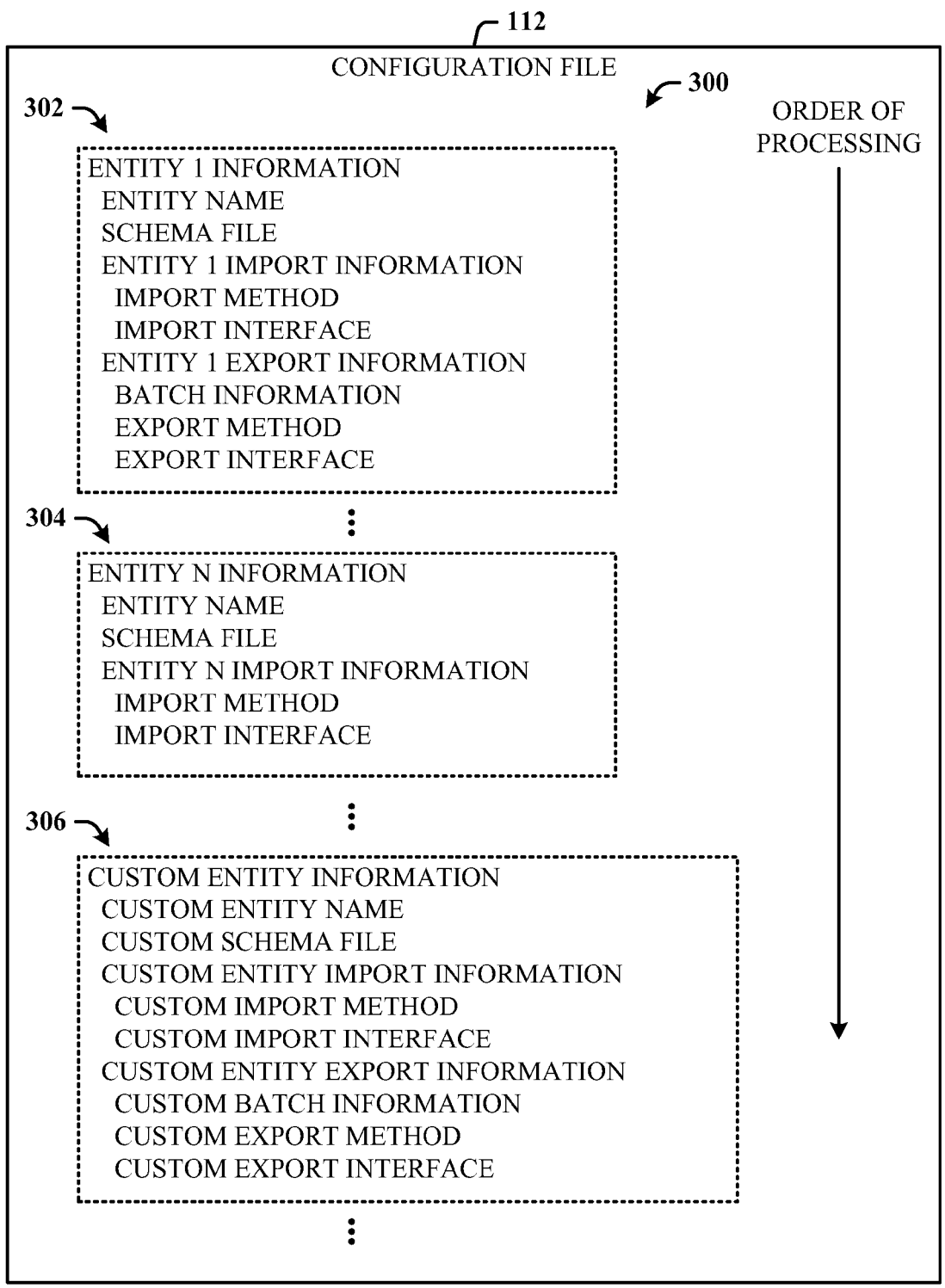
FIG. 3 illustrates a generalized configuration file that defines entity information.

FIG. 3 illustrates a generalized configuration file 112 that defines entity information 300. The entity information 300 can include first entity information 302 that further defines the entity name and associated entity schema file. The first entity information 302 can further define first entity import information and first entity export information. The first entity import information can include an import method and an import interface. Similarly, the first entity export information can include batch information for dynamic batching, an export method, and an export interface.

The entity information 300 can include Nth entity information 304 that further defines the Nth entity name and associated Nth entity schema file. The Nth entity information 304 can further define Nth entity import information. The Nth entity import information can include an Nth import method and an Nth import interface. As described, the entity can include combinations of import and/or export.

As previously indicated, extensibility is provided by the configuration file and the modular interface component. Accordingly, the configuration information 300 can further include custom entity information 306 for invoking custom methods and interfaces. For example, the custom entity information 306 that further defines the custom entity name and associated custom entity schema file. The custom entity information 306 can further define custom entity import information and custom entity export information. The custom entity import information can include a custom import method and a custom import interface. Similarly, the custom entity export information can include batch information for dynamic batching, a custom export method, and a custom export interface. Other custom entities can be provided as well.

Following is a more detailed example of the contents of a configuration file (e.g., configuration file 112) as written in XML (extensible markup language).

```
<?xml version="1.0" encoding="utf-8 ?>
- <ConfigRoot>
  - <Entity>
      <Name>Entity1</Name>
      <SchemaFile>Entity1.xsd</SchemaFile>
    - <Import>
        <AssemblyName>Entity1.dll</AssemblyName>
        <IEntityImportImplementation>Entity1_Import
      </IEntityImportImplementation>
      </Import>
    - <Export>
        <BatchCount>100</BatchCount>
        <AssemblyName>Entity1.dll</AssemblyName>
        <IEntityExportImplementation>Entity1_Export
      </IEntityExportImplementation>
      </Export>
    </Entity>
  - <Entity>
      <Name>Entity2</Name>
      <SchemaFile>Entity2.xsd</SchemaFile>
    - <Import>
        <AssemblyName>Entity2.dll</AssemblyName>
        <IEntityImportImplementation>Entity2_Import
      </IEntityImportImplementation>
      </Import>
    </Entity>
  - <Entity>
      <Name>Entity3</Name>
      <SchemaFile>Entity3.xsd</SchemaFile>
```

-continued

```
-  <Export>
      <BatchCount>200</BatchCount>
      <AssemblyName>Entity3.dll</AssemblyName>
      <IEntityExportImplementation>Entity3_Export
   </IEntityExportImplementation>
   </Export>
   </Entity>
-  <Entity>
      <Name>CustomEntity</Name>
      <SchemaFile>CustomEntity.xsd</SchemaFile>
-     <Import>
         <AssemblyName>CustomEntity.dll</AssemblyName>
         <IEntityImportImplementation>CustomEntity_Import
      </IEntityImportImplementation>
      </Import>
-     <Export>
         <BatchCount>500</BatchCount>
         <AssemblyName>CustomEntity.dll</AssemblyName>
         <IEntityExportImplementation>CustomEntity_Export
      </IEntityExportImplementation>
      </Export>
   </Entity>
</ConfigRoot>
```

Figure 4:
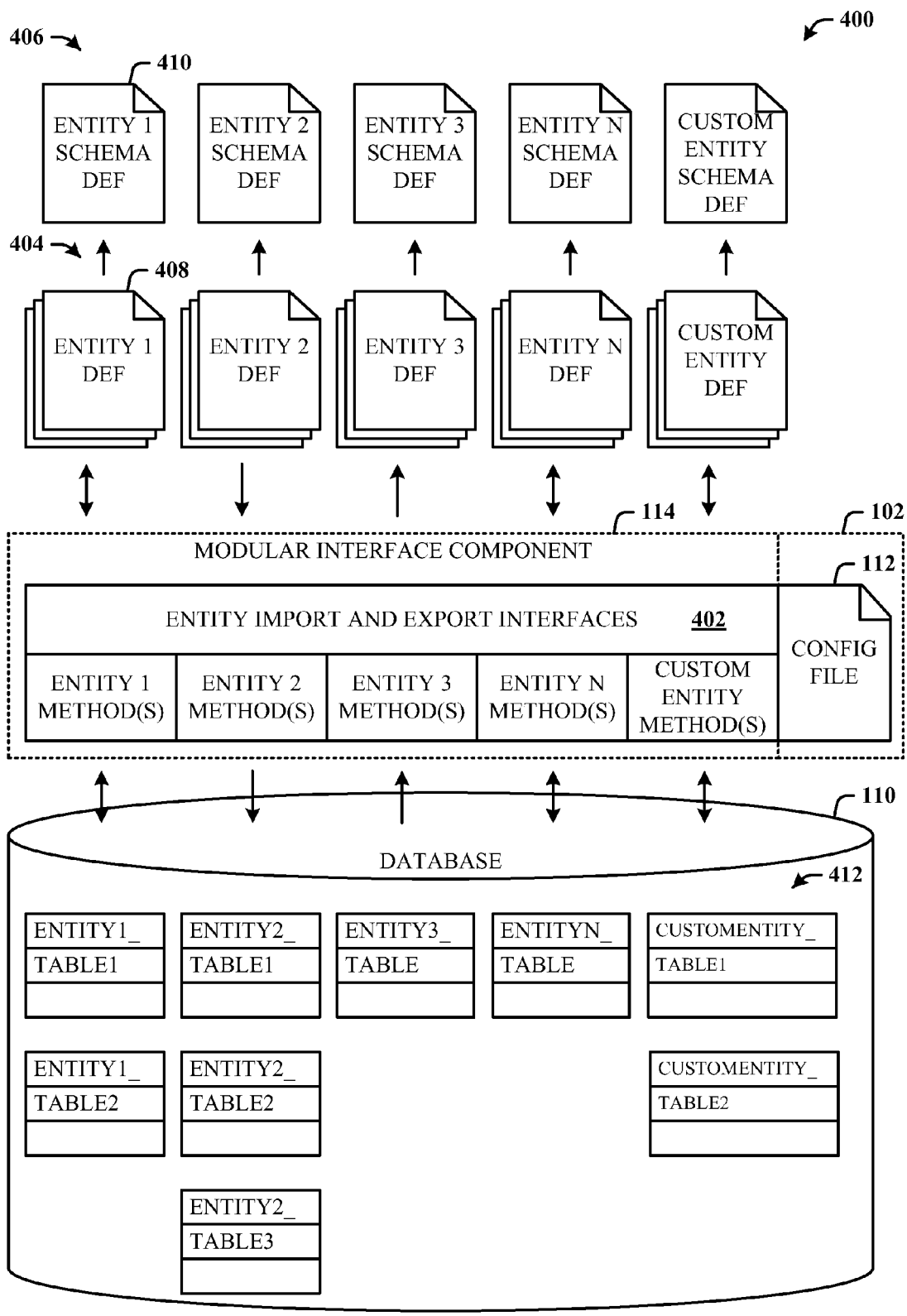
FIG. 4 illustrates a data import and export framework in accordance with the disclosed data processing architecture.

FIG. 4 illustrates a data import and export framework 400 in accordance with the disclosed data processing architecture. The framework 400 illustrates the modular interface component 114 as including entity import and entity export interfaces 402 to one or more entity methods (e.g., denoted Entity 1 Method(s), Entity 2 Method(s), . . . ,Entity N Method(s), and Custom Entity Method(s)). The methods can be DLL (dynamic link library) files, for example. The modular interface component 114 interfaces to the extensible definition component 102 and associated configuration file 112. The extensibility is provided by the configuration file 112 and modular interface component 114, which allow adding additional entity information or removing entity information as well as associated entity methods (e.g., custom).

The framework 400 shows example entity definitions 404 (e.g., Entity 1 Def) that can be written in XML and further associated with entity schema definitions 406. The schema definitions 406 define the schema of the corresponding entity definitions 404. One or more of the entity schema definitions 406 and entity definitions 404 can be associated with a single application (e.g., business) or different applications.

The entity definitions 404 include a first set of one or more entity definitions 408 that are further associated a first entity schema 410. Import and/or export definitions defined in the configuration file 112 for the first entity further define the entity method(s) (Entity 1 Method(s)) to invoke for data import and export between the corresponding application and data locations in the database 110, as well as the import and export interfaces 402. The bi-directional arrow under the Entity 1 Def 408 indicates both import and export operations. A single-headed arrow in the upward direction indicates an export operation relative to the data in the database 110. A single-headed arrow in the downward direction indicates an import operation relative to the data in the database 110.

The data locations in the database 110 are defined according to database tables 412. Here, the data for the first entity is related to two database tables: Entity1_Table1, and Entity1_Table2. Tables are also provided to other entities, such as a custom entity. The above example XML configuration file directly relates to the entities and, import/export operations and modules shown in the framework 400.

The data import and export framework 400 allows a business application to exchange data with other business applications. Each type of business entity can be defined with an XML schema that represents the logical entity such that the logical entity is agnostic as to how the entity data is stored in the server database tables.

The application uses a metadata-based dynamic framework to import and export data from the database 110. The configuration file 112 is created for the application and lists each entity that can be imported and/or exported by the application. The file configuration 112 defines how the framework 400 imports or exports the entity.

The order in which the entities appear in the configuration file 112 specifies the order in which the entities are processed during import/export. The order can be manually defined by the user or automatically defined by software through parsing of the entity schema files and building (e.g., dynamically) the relationship between the entities. If the order is manually defined in the configuration file, the sequence in which entities appear in configuration file 112 is based on relationships between entities—dependent entities typically appear after the entities on which the dependent entities depend. For example, if the entity "Item" appears before the entity "Order", then during importing or exporting of the data, records of the entity type "Item" are imported or exported before records of the entity type "Order". The <SchemaFile> element in the configuration file 112 points to the schema definition file that contains the schema for that entity. The <Import> and <Export> elements specify whether the entity is imported and/or exported, respectively. For example, Entity2 in the example configuration file described above is imported only, whereas Entity3 is exported only.

The above described configuration file 112 shows a simple example where the entities appear sequentially (in a linear fashion). More complex relationships can exist among the entities such that the configuration file 112 uses a tree-like or graph-like structure to describe the relationship. For example, one branch that shows "Item" depends on "Supplier", whereas another independent branch shows "Customer" only, which depends neither on "Item" nor on "Customer".

During data import to the database 110, the framework 400 parses the configuration file 112 to determine the specific entity of the record. Based on information in configuration file 112, the framework 400 first validates the format of the data being imported against the schema definition (e.g. XML schema definition-XSD) that defines the schema in which data can be imported. The framework 400 then dynamically loads the module defined in the configuration file 112 as the import processor and calls the module to import the record of that entity type. The module import function (of the corresponding entity method) then parses the data for the record, applies logic (e.g., business) specific to the entity, and then saves data for the logical entity into appropriate tables 412 in the application database 110.

The data export process is the reverse process of import. During each export, for each entity type defined in configuration file 112, a module is loaded that is defined as the export processor for the entity and calls the export interface function of the interfaces 403 to export records of that entity type from the database 110.

Because the import-export framework 400 utilizes a metadata-based model, the framework 400 provides flexibility for customization in terms of ability to introduce new entities. Additionally, the framework 400 provides a modular design such that the business logic for importing and exporting each entity can be contained within separate modules.

To add a custom business entity (e.g., Custom Entity), a new schema can be defined (e.g., Custom Entity Schema Def), new tables can be added to the server database 110 (e.g., Custom Entity_Table1), new modules (e.g., Custom Entity Method(s)) can implement the import and export interfaces 402 to import and export the data using business logic specific to the custom entity. New entries can be added to configuration file 112 to configure the import and export behavior for the custom entity.

Based on the configuration file 112, the framework 400 processes the entity definitions 404, including the custom entity, in the defined order, validates the data being imported using the specified XML schema, loads the entity specific modules (entity method(s)), and invokes the import and export functions corresponding to each entity.

For the export process, there can be a limit on the size of the exported data imposed by the consumers of the exported data. If the data being exported from database 110 is too large for the exported data is to be saved in one file, the exported data can be broken up into multiple batches of records that can be saved to multiple files where each file is smaller than a predefined size limit. However, the size of each record can vary depending on the type of entity and what data exists in the record. For example, for an Item entity, each record can be 1200 bytes, whereas for an Order record, each record can be 8000 bytes. Similarly, different records of the same entity can be of different sizes. For example, one item record can be 1200 bytes and another can be 1500 bytes (if, for example, the item description is larger for the second record). Hence, when data being exported needs to be broken up into multiple batches in order to restrict the size of each batch to a predetermined size limit, the number of records in each batch cannot always be pre-determined. Each batch can contain a different number of records as long as it meets the pre-determined size limit per batch. A dynamic batching pattern utilized by the framework 400 breaks large amounts of exported data into multiple batches (e.g., multiple XML documents).

Figure 5:
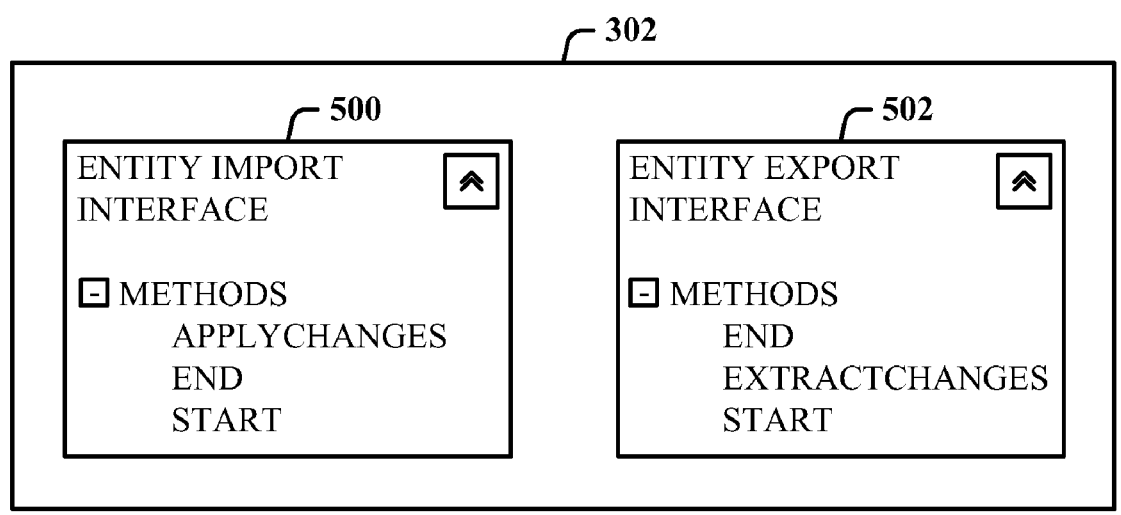
FIG. 5 illustrates exemplary import and export interfaces.

FIG. 5 illustrates exemplary import and export interfaces 402. The data import and export logic for each business entity is contained in separate modules (e.g., Entity 1 Method(s), Entity 2 Method(s), Entity N Method(s), etc) as shown in the framework 400 of FIG. 4. The application framework 400 defines an entity import interface 500 and an entity export interface 502 as two pre-defined interfaces which need to be implemented by the module for importing and exporting records of that entity type.

In the configuration file, for each entity, the <AssemblyName> and <IEntityImportImplementation> elements specify the module and function that implement the entity import interface 500, whereas the <AssemblyName> and <IEntityExportImplementation> elements specify the module and function that implements the entity export interface 502.

When importing or exporting data for the application, the imported or exported data is in flat XML files (e.g., Entity 1 Def 408 of FIG. 4). Note that formats other than XML and methods of storage other than flat files can be used without departing from the scope of the disclosed architecture. There can be one or more such files that are imported or exported. Each file contains data for one or more records of an entity type. Note that each file can contain records for multiple entity types as well, without departing from the scope of the disclosed architecture. The data for each record of an entity type conforms to the schema (e.g., Entity 1 Schema Def 410 of FIG. 4) for that type of business entity (e.g. Entity 1). Each of the definitions 404 that is imported or exported contains the data of multiple instances for a type of entity.

The entity export interface 502 is implemented by the modules that extract the data from the database 110. For each entity type, a <BatchCount> element in the configuration file 112 specifies the recommended number of individual records in each batch (e.g., in each XML document). The framework 400 calls an extract changes method (e.g., IEntityExport.ExtractChanges), passing in a recommended BatchCount value per XML file and a reference to a callback interface (e.g., ISubmitChange). The module that implements exporting data for the entity implements the extract changes method. The module reads appropriate data from the database 110 and then calls a submit method of the callback interface (e.g., ISubmitChange.Submit) one or more times (e.g., once per batch) to submit data to be exported.

If the data to be exported is too large to fit in a single XML document, the implementation for the extract changes method calls the submit method multiple times to create multiple XML documents, one document for each time the module calls the submit method. The module that implements the extract changes method reads data to be exported from the database 110. The module first extracts n number of records of that entity type from the database 110. The initial value of n is equal to BatchCount—which is the recommended number of records of that entity type to be exported in each file.

If the size in bytes of the n number of records is below the size limit in bytes per batch, the module calls the submit method to submit the n number of records in a batch; otherwise, another attempt is made to extract the changes from the database—this time with a fewer number of records.

The value of n is increased or decreased by a factor of the size limit over the actual document size (e.g., n=n*SizeLimit/ActualSizeOfnRecords). Thus, the value of n can be dynamically calculated to ensure that the number of records extracted in each iteration fits into the size limit of the export file. The submit method is called repeatedly until all data is exported.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
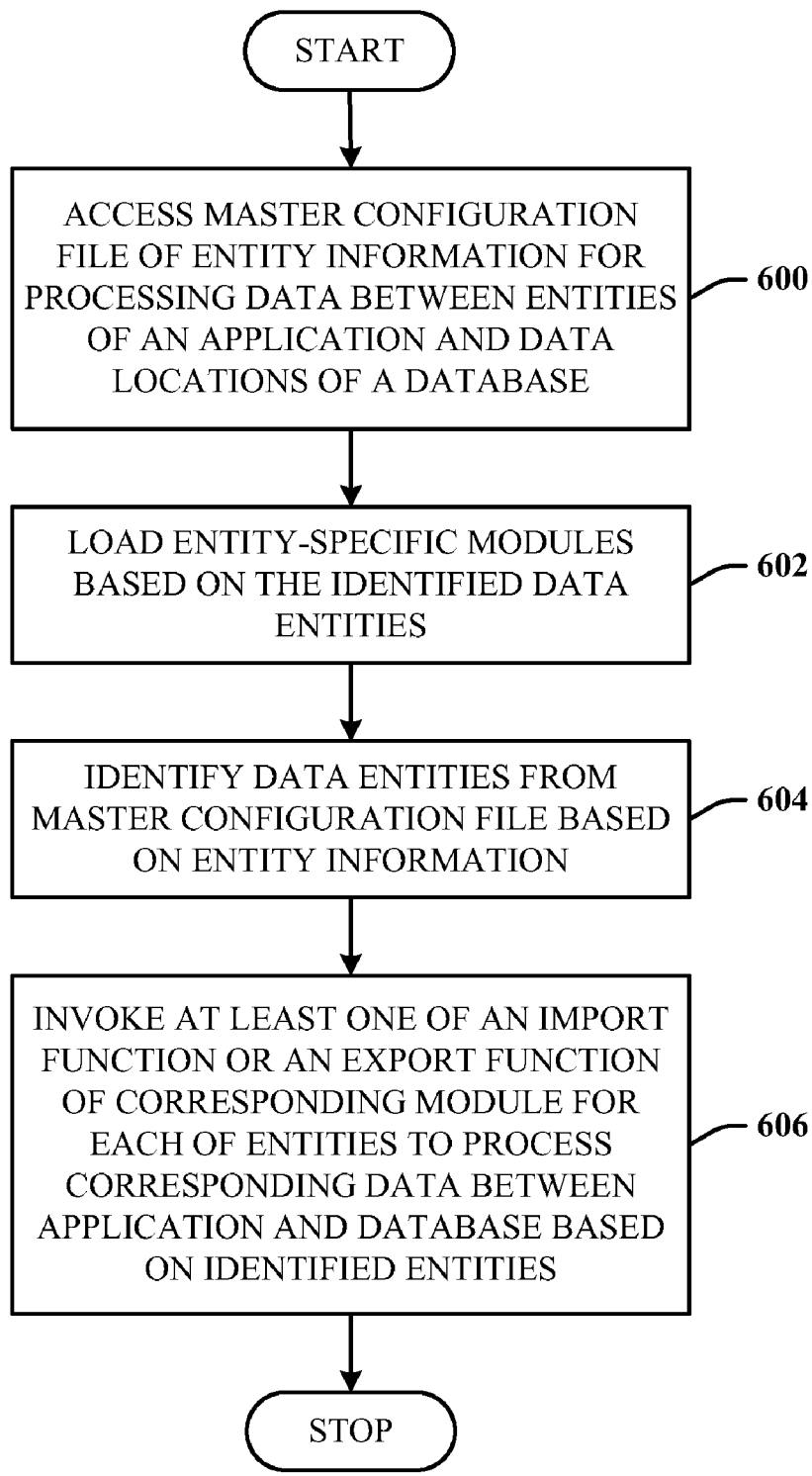
FIG. 6 illustrates a method of data processing in accordance with the disclosed architecture.

FIG. 6 illustrates a method of data processing in accordance with the disclosed architecture. At 600, a master configuration file of entity information is accessed for processing data between entities of an application and data locations of a database. At 602, data entities are identified from the master configuration file based on the entity information. At 604, entity-specific modules are loaded based on the identified data entities. At 606, at least one of an import function or an export function is invoked in the corresponding module for each of the entities to process the corresponding data between the application and the database based on the identified entities.

Figure 7:
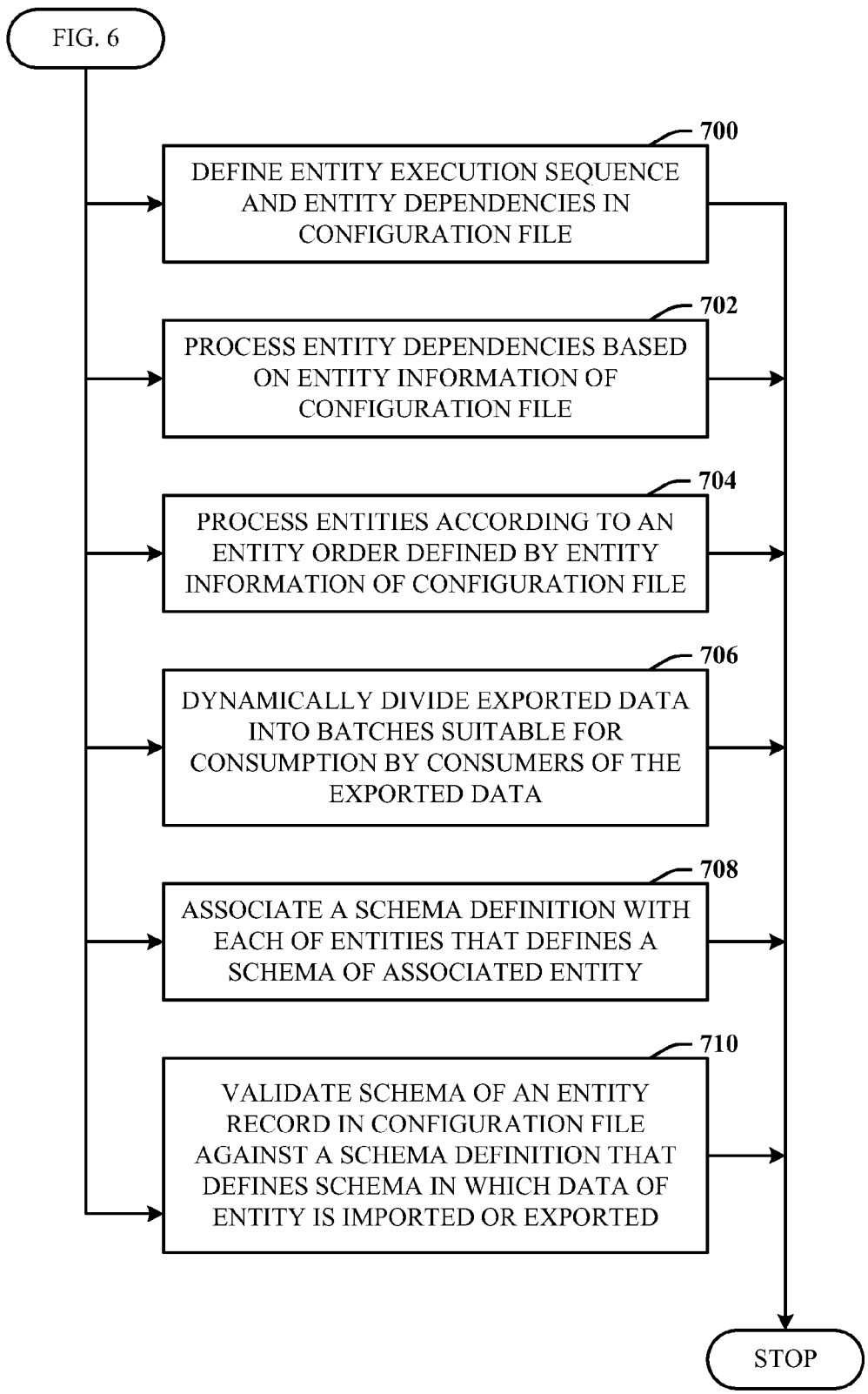
FIG. 7 illustrates additional aspects of the method of FIG. 6.

FIG. 7 illustrates additional aspects of the method of FIG. 6. At 700, an entity execution sequence and entity dependencies are defined in the configuration file. At 702, entity dependencies are processed based on the entity information of the configuration file. At 704, the entities are processed according to an entity order defined by the entity information of the configuration file. At 706, data for export is dynamical divided into batches suitable for consumption by consumers of the exported data. At 708, a schema definition is associated with each of the entities that defines a schema of the associated entity. At 710, a schema of an entity record in the configuration file is validated against a schema definition that defines the schema in which the data of the entity is imported or exported.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical, solid state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 8:
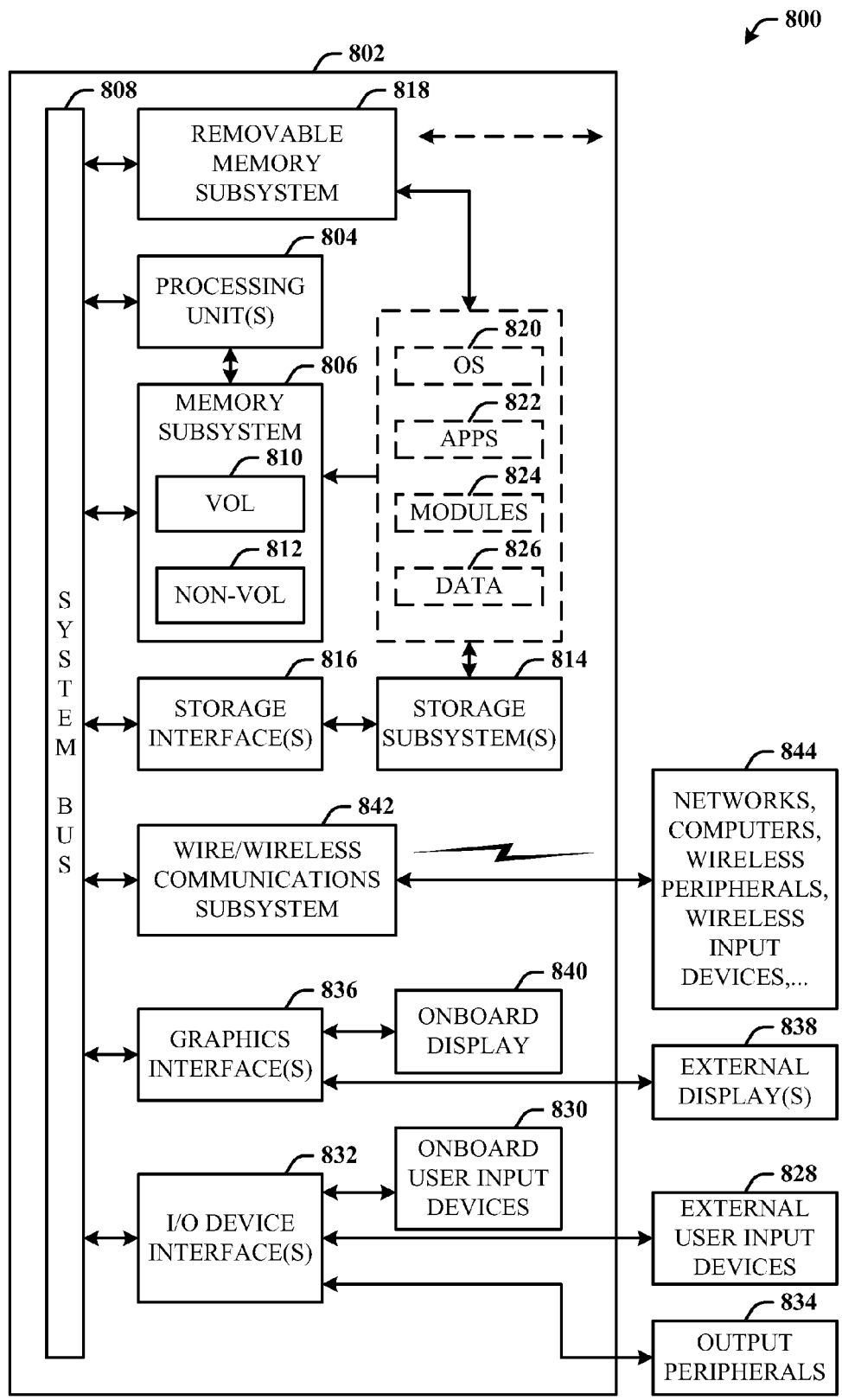
FIG. 8 illustrates a block diagram of a computing system operable to execute the disclosed extensible data import/export architecture.

Referring now to FIG. 8, there is illustrated a block diagram of a computing system 800 operable to execute the disclosed extensible data import/export architecture. In order to provide additional context for various aspects thereof, FIG. 8 and the following discussion are intended to provide a brief, general description of the suitable computing system 800 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 800 for implementing various aspects includes the computer 802 having processing unit(s) 804, a system memory 806, and a system bus 808. The processing unit(s) 804 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 806 can include volatile (VOL) memory 810 (e.g., random access memory (RAM)) and non-volatile memory (NON-VOL) 812 (e.g., ROM, EPROM, EEPROM, etc.). A basic input/output system (BIOS) can be stored in the non-volatile memory 812, and includes the basic routines that facilitate the communication of data and signals between components within the computer 802, such as during startup. The volatile memory 810 can also include a high-speed RAM such as static RAM for caching data.

The system bus 808 provides an interface for system components including, but not limited to, the memory subsystem 806 to the processing unit(s) 804. The system bus 808 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 802 further includes storage subsystem(s) 814 and storage interface(s) 816 for interfacing the storage subsystem(s) 814 to the system bus 808 and other desired computer components. The storage subsystem(s) 814 can include one or more of a hard disk drive (HDD), a magnetic floppy disk drive (FDD), and/or optical disk storage drive (e.g., a CD-ROM drive DVD drive), for example. The storage interface(s) 816 can include interface technologies such as EIDE, ATA, SATA, and IEEE 1394, for example.

One or more programs and data can be stored in the memory subsystem 806, a removable memory subsystem 818 (e.g., flash drive form factor technology), and/or the storage subsystem(s) 814 (e.g., optical, magnetic, solid state), including an operating system 820, one or more application programs 822, other program modules 824, and program data 826.

The one or more application programs 822, other program modules 824, and program data 826 can include the components, modules, file and entities of FIG. 1, the components, modules, file and entities of FIG. 2, the example configuration file of FIG. 3, the framework 400 of FIG. 4, the interfaces 402 of FIG. 5, and the methods represented by the flow charts of FIGS. 6-7, for example.

Generally, programs include routines, methods, data structures, other software components, etc., that perform particular tasks or implement particular abstract data types. All or portions of the operating system 820, applications 822, modules 824, and/or data 826 can also be cached in memory such as the volatile memory 810, for example. It is to be appreciated that the disclosed architecture can be implemented with various commercially available operating systems or combinations of operating systems (e.g., as virtual machines).

The storage subsystem(s) 814 and memory subsystems (806 and 818) serve as computer readable media for volatile and non-volatile storage of data, data structures, computer-executable instructions, and so forth. Computer readable media can be any available media that can be accessed by the computer 802 and includes volatile and non-volatile media, removable and non-removable media. For the computer 802, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 802, programs, and data using external user input devices 828 such as a keyboard and a mouse. Other external user input devices 828 can include a microphone, an IR (infrared) remote control, a joystick, a game pad, camera recognition systems, a stylus pen, touch screen, gesture systems (e.g., eye movement, head movement, etc.), and/or the like. The user can interact with the computer 802, programs, and data using onboard user input devices 830 such a touchpad, microphone, keyboard, etc., where the computer 802 is a portable computer, for example. These and other input devices are connected to the processing unit(s) 804 through input/output (I/O) device interface(s) 832 via the system bus 808, but can be connected by other interfaces such as a parallel port, IEEE 1394 serial port, a game port, a USB port, an IR interface, etc. The I/O device interface(s) 832 also facilitate the use of output peripherals 834 such as printers, audio devices, camera devices, and so on, such as a sound card and/or onboard audio processing capability.

One or more graphics interface(s) 836 (also commonly referred to as a graphics processing unit (GPU)) provide graphics and video signals between the computer 802 and external display(s) 838 (e.g., LCD, plasma) and/or onboard displays 840 (e.g., for portable computer). The graphics interface(s) 836 can also be manufactured as part of the computer system board.

The computer 802 can operate in a networked environment (e.g., IP) using logical connections via a wired/wireless communications subsystem 842 to one or more networks and/or other computers. The other computers can include workstations, servers, routers, personal computers, microprocessor-based entertainment appliance, a peer device or other common network node, and typically include many or all of the elements described relative to the computer 802. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 802 connects to the network via a wired/wireless communication subsystem 842 (e.g., a network interface adapter, onboard transceiver subsystem, etc.) to communicate with wired/wireless networks, wired/wireless printers, wired/wireless input devices 844, and so on. The computer 802 can include a modem or has other means for establishing communications over the network. In a networked environment, programs and data relative to the computer 802 can be stored in the remote memory/storage device, as is associated with a distributed system. It will be appreciated that the network connections shown are exemplary and other means of establishing a communications link between the computers can be used.

The computer 802 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 9:
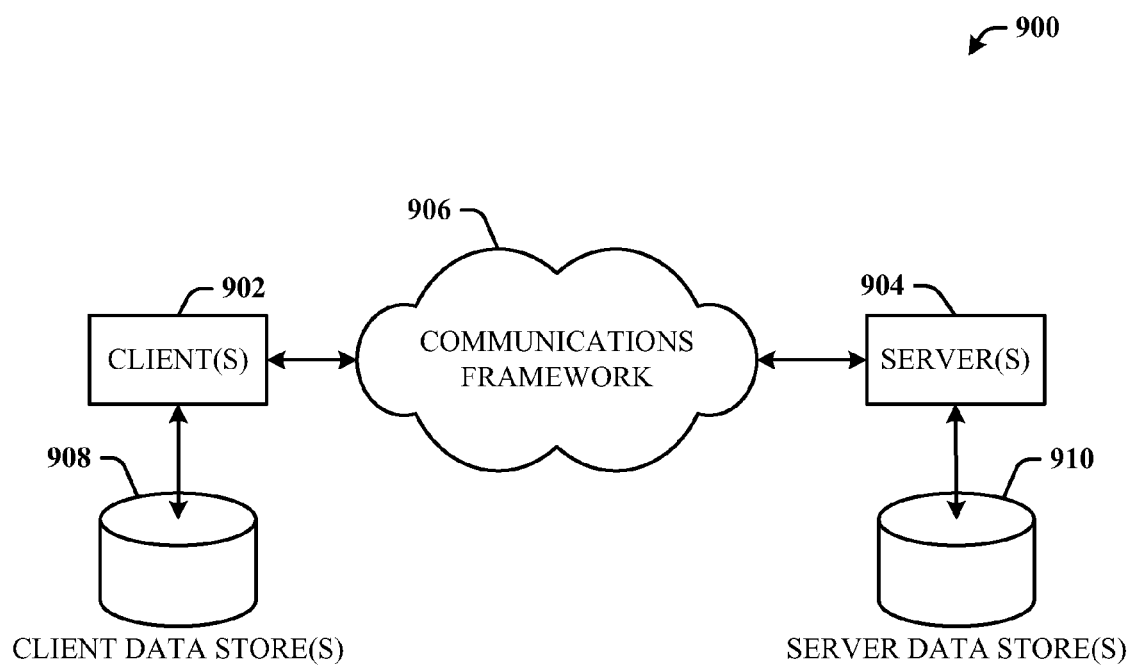
FIG. 9 illustrates a schematic block diagram of a computing environment that supports the disclosed extensible data import/export architecture.

Referring now to FIG. 9, there is illustrated a schematic block diagram of a computing environment 900 that supports the disclosed extensible data import/export architecture. The environment 900 includes one or more client(s) 902. The client(s) 902 can be hardware and/or software (e.g., threads, processes, computing devices). The client(s) 902 can house cookie(s) and/or associated contextual information, for example.

The environment 900 also includes one or more server(s) 904. The server(s) 904 can also be hardware and/or software (e.g., threads, processes, computing devices). The servers 904 can house threads to perform transformations by employing the architecture, for example. One possible communication between a client 902 and a server 904 can be in the form of a data packet adapted to be transmitted between two or more computer processes. The data packet may include a cookie and/or associated contextual information, for example. The environment 900 includes a communication framework 906 (e.g., a global communication network such as the Internet) that can be employed to facilitate communications between the client(s) 902 and the server(s) 904.

Communications can be facilitated via a wire (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing device for data processing, the computing device comprising:
   a memory;
   a data store;
   a processor coupled to the memory and the data store, the processor being arranged to manage a plurality of components in conjunction with instructions stored on the memory device for data processing, the components comprising:
      a definition component for defining exchange of data between entities of an application and data locations of a database employing a configuration file for defining entity information that defines an entity name, an associated entity schema file, entity import information, entity export information, an entity order sequence, an import method, and an import interface, wherein the exchange is defined in the configuration file by the entity definitions and entity schemas;
      a modular interface component for processing one or more modules that facilitate the exchange of the data between the entities and data locations based on the configuration file; and
      a batch component for dividing exported data into batches suitable for consumption by consumers of the exported data, wherein each batch includes a predetermined size limit of data per batch.

2. The computing device of claim 1, wherein the definition component and modular interface component are part of a business framework that handles business data between the database and a business application.

3. The computing device of claim 1, wherein the entities are processed according to the entity order sequence defined in the configuration file.

4. The computing device of claim 1, wherein the configuration file further includes entity dependencies that are processed according to the entity order sequence.

5. The computing device of claim 1, wherein each of the entities is associated with a corresponding entity schema that defines entity dependencies and an import/export operation.

6. The computing device of claim 1, wherein each of the one or more modules includes at least one of import logic or export logic for data of a specific entity.

7. The computing device of claim 1, wherein the configuration file is extensible for defining new entities and new schemas for data import/export between the application and the database.

8. The computing device of claim 1, further comprising a user interface for interacting with the definition component to edit the configuration file and entities, and interacting with the modular interface component to insert a new module or remove an existing module for import and export of the data.

9. A system for data processing to be executed on a computing device the system comprising:
   an extensible definition component for defining exchange of business data between entities of a business application and a data locations of a business database, schemas;
   a configuration file for defining entity information, the entity information defining an entity name, an associated entity schema file, entity import information, entity export information, an entity order sequence, an import method and an import interface; wherein the exchange of business data is defined in the configuration file by entity definitions and entity schemas;
   a modular interface component for processing one or more modules that facilitate the exchange of the business data between the entities and data locations based on the configuration file, the one or more modules include at least one of import or export logic for a specific data entity; and
   a batch component for dividing the configuration file into subfiles suitable for consumption by consumers during export of the data, wherein each batch includes a predetermined size limit of data per batch.

10. The system of claim 9, wherein the entities are processed according to the entity order sequence and entity dependencies both defined in the configuration file.

11. The system of claim 9, wherein the extensible definition component receives new entity information for definition in the configuration file and the modular interface component receives one or more new modules for processing import or export of data of new entities according to the new entity information.

* * * * *